Aug. 16, 1932.   H. ERNST ET AL   1,872,626
HYDRAULIC VALVE
Filed March 8, 1930
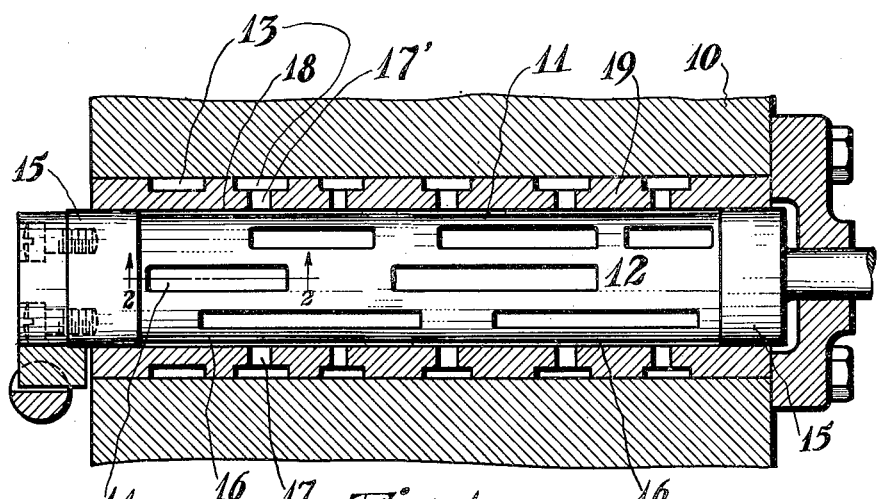
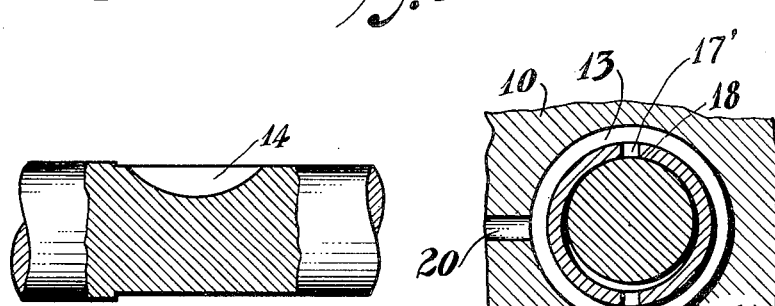
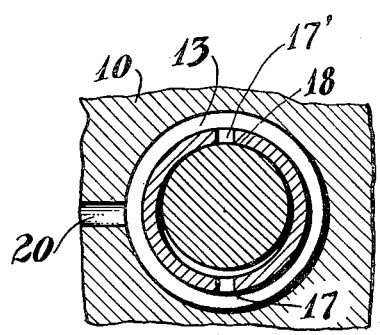
Inventor
HANS ERNST
CHARLES W. GOODRICH
By A. K. Parsons
Attorney Patented Aug. 16, 1932

1,872,626

UNITED STATES PATENT OFFICE

HANS ERNST AND CHARLES W. GOODRICH, OF CINCINNATI, OHIO, ASSIGNORS TO THE CINCINNATI MILLING MACHINE COMPANY, OF CINCINNATI, OHIO, A CORPORATION OF OHIO

HYDRAULIC VALVE

Application filed March 8, 1930. Serial No. 434,415.

This invention relates to hydraulic valves and more particularly to improvements in valves of the piston type.

In the operation of hydraulic systems where the working fluid such as oil is under high pressure, it has been found that the fluid has a tendency in the control valves to leak or spread around the orifice of a high pressure port between the valve piston and its casing, due to imperfections in the surface of the valve or to the fact that the valve is slightly displaced laterally of its casing, thereby creating an unbalanced pressure on the port side of the valve. This causes the valve to be forced laterally into great frictional contact with the opposite wall of the casing, preventing free movement of the valve. In order to obviate this, one of the principal objects of this invention is the provision of a valve so constructed as to permit the formation of a slight film of high pressure fluid completely surrounding the periphery of the valve, thus maintaining the valve in a balanced condition and capable of free movement.

Another object of this invention is to reduce the resistance offered to the movement of the valve by its deflection under an unbalanced load.

Referring to the drawing, in which like reference numerals indicate like parts:

Figure 1 represents a valve embodying the principles of this invention;

Figure 2 is a detail section on the line 2—2 of Figure 1; and

Figure 3 is a detail section showing in exaggerated form the lateral displacement of the valve when closing a high pressure port.

The reference numeral 10 indicates a valve casing in which is fixed the bushing 19 having a bore 11. A valve 12 is mounted in this bore and adapted to be rotated or reciprocated therein to control the flow of a working fluid from a high pressure source to the working parts in the manner shown for instance in the copending application of Hans Ernst et al, Serial Number 220,721. To this end the valve is provided with semi-circular slots such as 14, shown more particularly in Figure 2, which are adapted to register with determined ports to permit the flow of fluid from one to the other.

The bushing 19 has a series of ports such as 17 formed in one side of the valve and another series of ports 17¹ formed in the other side each one of the latter being diametrically opposite to a port 17. In other words the ports are arranged in longitudinally and circumferentially spaced pairs the members of each pair diametrically opposing one another. A series of annular grooves 13 are formed preferably in the periphery of the bushing 19 and each communicates with a pair of opposing ports or a plurality of pairs of opposing ports in the bushing. Each groove 13 also communicates with an exterior channel 20 formed in the casing 10. The grooves 13 may be connected in determined order to permit flow from one exterior channel to another, in which case the fluid would enter the groove to a pair of opposing ports and by means of the longitudinal slots 14 registering therewith flow out through another pair of ports and their communicating groove. It is apparent that the hydraulic medium flowing through the channel 20 to or from the valve will enter or leave the valve by two diametrically opposed ports. The ports are arranged in this manner in an attempt to equalize the pressure on the valve.

However this arrangement is not sufficient to produce perfect equalization due to the unequal leakage areas which form around the orifices of the ports when they are under high pressure, caused by imperfections in the surface of the valve spool or bushing or by a poor fit of the valve in its bushing permitting a slight lateral play. These areas being uncontrolled, are irregular in shape and it would be a coincidence if the total leakage area on one side of the valve was equal to that on the other side. Since the leakage area represents pressure area and therefore the pressure on the valve it is evident that the opposing pressures on the valve would be unequal and therefore cause movement of the valve toward the low pressure side 18 for instance as shown in exaggerated form in Figure 3. Therefore in order to insure that the leakage area on each side of the valve is the same, the diameter of the valve is slightly reduced as at 16 leaving the lands or bearing portions 15 at opposite ends of a diameter for sliding fit in the bushing, and it is to be understood that within the range of movement of the valve, these bearing portions will remain within the bushing. This permits the formation of a film of oil or other hydraulic medium entirely surrounding the valve, and at the same time permits further lateral movement of the valve without danger of sticking or binding. In other words the indeterminable leakage areas are now combined and increased to a determinable area totally surrounding the valve and bounded by the lands at either end. This permits the establishment of equal pressure on all sides of the valve and prevents the centralization of an unbalancing pressure at one point on the valve which would cause lateral movement thereof and consequent sticking or binding of the valve.

Attention is invited to the fact that the amount of reduction of the portion 16 with respect to the lands is very small amounting to only a fraction of a thousandth of an inch. In other words it is just sufficient to permit the formation of a film of fluid without permitting a flow of any appreciable amount to take place between the ports that are shut-off by the valve. Thus a balancing pressure is maintained on the valve while still preventing undue leakage between the ports when closed.

What is claimed is:

1. In combination with a valve casing, of a valve having a plurality of lands and means there between to permit the formation of a thin film of pressure fluid to equally balance the valve in its casing, said means being so constructed as to prevent a free flow of fluid.

2. In a valve casing having a plurality of fluid pressure and non-pressure ports, a valve slidably and rotatably mounted in said casing, said valve having a plurality of axial slots formed in the periphery thereof for determining connections between the ports, a plurality of longitudinally spaced lands on said valve connected by an intervening reduced portion whereby the fluid pressure may surround the valve to equally balance it in the casing.

3. In a device of the class described, a body having a plurality of flow channels therein, a hollow tubular member fixed in said body and having a series of annular grooves formed in its periphery respectively communicating with said channels each groove communicating with a pair of opposed ports formed therein, a valve member rotatably and slidably mounted in the tubular member, having means thereon to establish communication between determined pairs of ports and stabilizing means to prevent lateral movement of the valve in its bore.

4. In a valve casing having a plurality of high pressure ports, the combination of a valve slidably and rotatably mounted in the casing, a plurality of axial slots formed in the periphery of the valve for determining connections between the ports, said valve having a plurality of spaced bearing portions for maintaining it centrally of its bore and intervening reduced portions for permitting the establishment of a surrounding film of fluid pressure to cause the forces acting laterally of the valve to substantially equalize themselves.

5. In combination with a valve casing having a plurality of ports therein, a valve member movably mounted in the casing for determining fluid flow between the ports, said valve having a plurality of longitudinally spaced circumferential lands formed thereon and a reduced intervening cylindrical portion connecting a pair of said lands, the reduced portion being so constructed as to permit a fluid film forming leakage to surround the valve and balance it while preventing a fluid flow between closed ports in the casing.

6. In combination with a valve casing having a plurality of pressure and non-pressure ports, a cylindrical valve stem having lands on opposite ends for seating in said casing, an intervening portion connecting said lands for determining flow between cylinder ports by rotation or reciprocation of the valve stem, and means between the portion and the valve casing to cause the formation of fluid balancing means without permitting flow from the pressure ports to closed non-pressure ports.

In testimony whereof we affix our signatures.

HANS ERNST.
CHARLES W. GOODRICH.